(12) United States Patent
Levi

(10) Patent No.: US 10,857,930 B1
(45) Date of Patent: Dec. 8, 2020

(54) LOAD HOLD-DOWN DEVICE WITH RETRACTABLE STRAP

(71) Applicant: Avraham Y. Levi, Eagan, MN (US)

(72) Inventor: Avraham Y. Levi, Eagan, MN (US)

( * ) Notice: Subject to any disclaimer, the term of this patent is extended or adjusted under 35 U.S.C. 154(b) by 0 days.

(21) Appl. No.: 16/591,314

(22) Filed: Oct. 2, 2019

(51) Int. Cl.
| | |
|---|---|
| *B60P 7/08* | (2006.01) |
| *B60R 9/058* | (2006.01) |
| *B60R 9/045* | (2006.01) |
| *B60R 9/042* | (2006.01) |
| *B60R 9/08* | (2006.01) |
| *B60R 9/04* | (2006.01) |
| *B60R 9/048* | (2006.01) |

(52) U.S. Cl.
CPC ............ *B60P 7/083* (2013.01); *B60P 7/0838* (2013.01); *B60P 7/0846* (2013.01); *B60R 9/04* (2013.01); *B60R 9/042* (2013.01); *B60R 9/045* (2013.01); *B60R 9/0423* (2013.01); *B60R 9/0485* (2013.01); *B60R 9/058* (2013.01); *B60R 9/08* (2013.01)

(58) Field of Classification Search
CPC ....... B60P 7/083; B60P 7/0838; B60P 7/0846; B60P 7/0823; B60R 9/08; B60R 9/0485; B60R 9/042; B60R 9/058; B60R 9/0423; B60R 9/045; B60R 9/04
USPC .... 410/12, 100, 97, 103; 254/217, 223, 369, 254/376; 24/68 CD
See application file for complete search history.

(56) References Cited

U.S. PATENT DOCUMENTS

| | | | |
|---|---|---|---|
| 4,900,203 A | * | 2/1990 | Pope ....................... B60P 7/083 410/100 |
| 5,282,706 A | | 2/1994 | Anthony et al. |
| 5,423,644 A | * | 6/1995 | First, Sr. ................ A44B 11/14 410/100 |
| 7,874,047 B2 | | 1/2011 | Breeden |
| 8,973,222 B2 | | 3/2015 | Breeden et al. |
| 2009/0279978 A1 | * | 11/2009 | Polin, Jr. ................ B65D 63/16 410/100 |
| 2019/0210511 A1 | | 7/2019 | Kingery |

FOREIGN PATENT DOCUMENTS

| | | |
|---|---|---|
| EP | 2698283 | 2/2014 |
| EP | 2885163 | 6/2015 |
| EP | 2915696 | 12/2016 |
| EP | 2803534 | 2/2018 |

\* cited by examiner

*Primary Examiner* — Stephen T Gordon
(74) *Attorney, Agent, or Firm* — Thomas J. Nikolai; DeWitt LLP

(57) ABSTRACT

A retractable strap load tie-down device includes a housing containing a tubular spool with a flat helical spring in its interior and a flexible tie-down strap wrapped on its exterior. The housing also includes a frame journaling a tensioning shaft for rotation where the tensioning shaft includes a slot through which the strap passes. Keyed to the end portions of the shaft are ratchet wheels and associate with the ratchet wheels are pawls that engage and disengage from the teeth of the ratchet wheels by action of a handle mounted, squeezable release bar that selectively displaces slide rods leading to the pawls. The handle will selectively rotate the tensioning shaft depending on the engagement of the pawls with the ratchet wheels. Swinging of the handle through an arc will tension the strap when the free end of the strap is anchored.

7 Claims, 4 Drawing Sheets

LOAD HOLD-DOWN DEVICE WITH RETRACTABLE STRAP

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to an apparatus for securing a load to a vehicle or the like during travel and, more particularly, to a device for storing a flexible, elongated strap that can be drawn from its housing to secure a load and which, when actuated, will retract the strap back into its housing.

II. Discussion of the Prior Art

The prior art is replete with devices for securing a load on a transport vehicle where tension is achieved by manually rotating a spool on which the strap is to be wound. Such devices require building tension in the entire spooled portion of the strap and the spool must be constructed using materials that will withstand the forces that are needed. Due to large diameter spooled strap leverage is reduced and harder to create tension. It will become apparent from the following description that strap tension in my design is achieved by rotating a stronger, smaller diameter tensioning shaft rather than by rotating the spool.

SUMMARY OF THE INVENTION

The retractable hold-down system of the present invention employs a unitary frame having a pair of parallel, spaced-apart ears projecting normally from an anchoring plate. A cylindrical metal tensioning shaft is journaled for rotation in aligned apertures formed in the ears of the frame and extends through opposed side walls of a housing also affixed to the ears of the frames.

The tensioning shaft has an axially extending slot formed diametrically through it and affixed to end portions of the tensioning shaft is a pair of ratchet gears. Also contained within the housing is a tubular spool that is mounted on a stationary shaft and disposed in the interior of the spool is a flat helical spring having one end anchored to the stationary shaft and the other end connected to an inner end of an elongated web strap that winds about an exterior of the tubular spool.

A first end of first and second handle arms are journaled for rotation on the opposed end portions of the tensioning shaft. The opposite ends of the handle arms are joined to one another by a hand grip member that contains a spring-biased release bar. The release bar is coupled at its opposed ends to a pair of elongated slide rods that are contained within channels formed in the pair of handle arms. The slide rods are adapted to selectively engage with and disengage from pawls associated with the pair of ratchet gears upon squeezing and release of the release bar. The pawls are pivotally joined to the ears of the frame and are adapted to cooperate with the ratchet gears to limit the direction of rotation of the tensioning shaft during manual reciprocal action of the hand grip member. The web strap is routed through the axially extending slot formed through the tensioning shaft and between a pair of guide pins before exiting an opening in the housing.

As the strap is drawn out through the opening in the housing and used to secure a load, it stores energy in the helical spring for effecting retraction of the strap when the strap is no longer held fixed. Once the strap is positioned around the load to be constrained and a hook on the end of the strap is connected to a stationary member, the slide rods in the handle can be made to engage and disengage the pawls from the ratchet gears on the tensioning bar to rotate the tensioning bar thereby drawing and wrapping a section of the strap about the tensioning bar. Once the tensioning bar is rotated about a half of a turn, the strap can no longer flow through the slot in the tensioning bar as it becomes wound upon itself. If desired tension is achieved when the handle is elevated, it can be brought down without pulling more strap by squeezing the release bar, which disengages the handle pawl from the ratchet gear. In order to release the load, the body mounted pawls need to be released. This is achieved by depressing the release bar and rotating the handle up to disengage the body mounted pawls. The strap tension is then relieved by grasping and pulling on the strap so as to spin the tension bar until the strap is unwound therefrom to the point where it can again flow through the slot and be retracted back onto its spool by the action of the helical flat spring.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
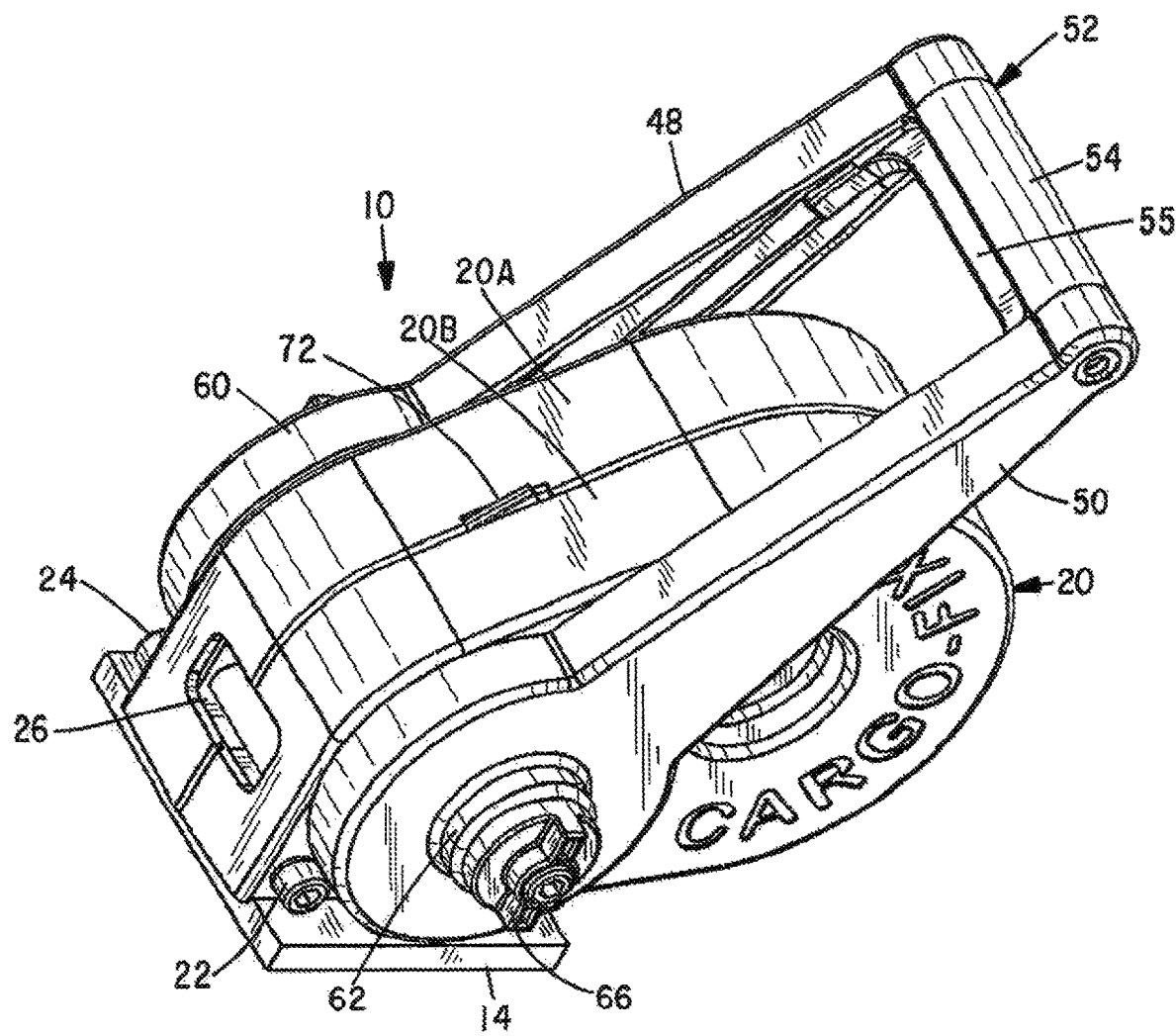
FIG. 1 is a perspective view of the retractable hold-down strap device of the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

As seen in FIG. 1, the retractable hold-down strap device of the present invention is indicated generally by numeral 10 and it comprise a metal frame 12 (FIG. 2) comprising an anchor plate 14 having first and second ears 16, 18 projecting normally therefrom in parallel spaced-apart relation. The anchor plate has apertures, as at 19, for receiving anchoring screws (not shown) therethrough whereby the device 10 can be affixed, for example, to a vehicle to tie down and thereby secure a load being transported.

A housing 20 (FIG. 1) preferably consists of two separable halves 20A and 20B of a suitable plastic. They are secured to the ears 16 and 18 of the frame by bolts, as at 22 and 24. The housing 20 has an opening 26 through which a flexible web tie down strap 21 (FIG. 4) is adapted to pass during use of the device for securing a load.

Without limitation, the strap 21 may be of nylon and be 1 inch wide and about 16 feet in length. A commercially available strap of these dimensions is rated to support a 300 kg working load. The strap will be wrapped about an exterior surface of a tubular spool 28. Coiled within the spool is a flat spiral spring 30 (FIG. 4). It is affixed at one end to a stationary axle 32 and the opposite end of the spring is made to pass through a slot 34 formed through the cylindrical wall of the spool 28 and attaches to the inner end of the strap 21. (The strap is not shown in FIG. 1-3 so as not to obscure the operating mechanism of the device 10.)

Figure 2:
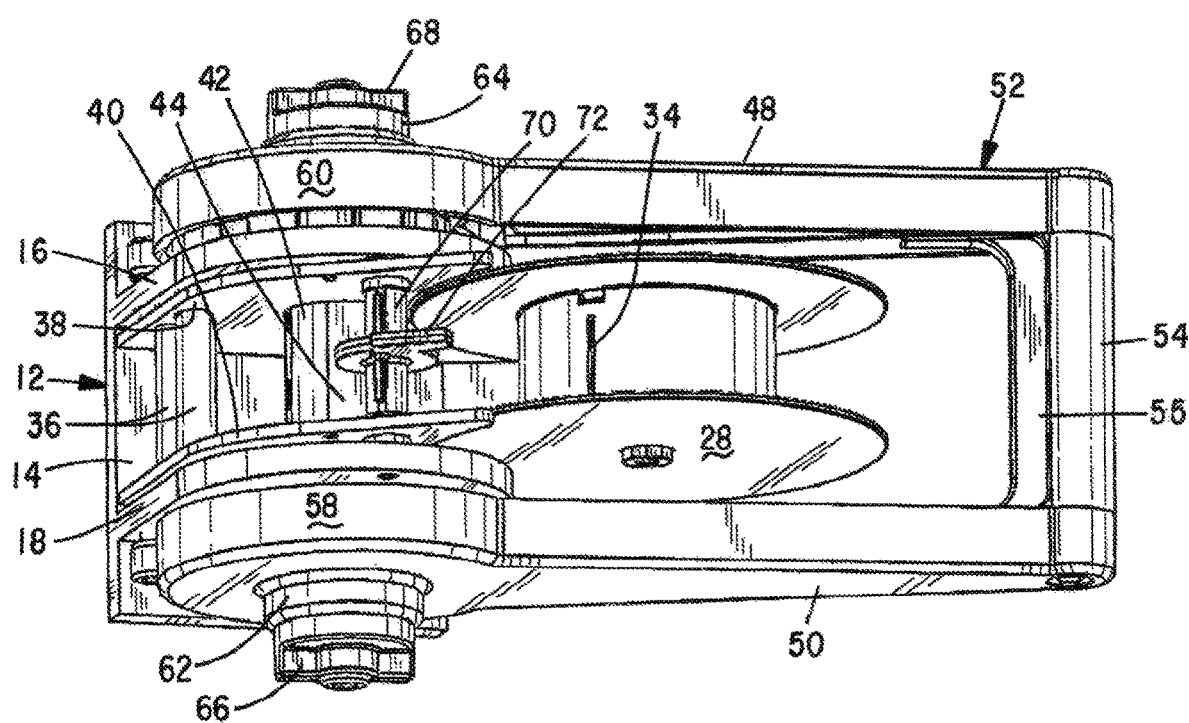
FIG. 2 is a perspective view thereof with the device's housing removed to reveal internal structures.

With continued reference to FIG. 2, the strap is routed between a pair of guide shafts 36 before exiting the opening 26 in the plastic housing 20. The guide shafts 36 are supported at opposed ends by ears 16, 18 and guide plates 38, 40 that serve to inhibit lateral shifting of the strap. The guide shafts serve to prevent damage to the plastic housing due to rubbing contact by the strap on the plastic.

Passing through aligned apertures in the guide plates 38, 40 and journaled for rotation in the frame ears 16 and 18 is a cylindrical metal tensioning shaft 42 having an axially extending slot 44 formed diametrically therethrough. The strap 21 is made to pass through the slot 44, as best seen in FIG. 4. The strap is shown as being terminated with a hook 46, but it is to be understood that other types of fasteners for securing the free end of the strap to an anchoring point can be used as well.

Referring once more to FIG. 1, it will be seen that the ends of the tensioning shaft 42 extend through the side walls of the housing halves 20A and 20B and through the arms 48 and 50 of a handle assembly indicated generally by numeral 52. The handle assembly includes a hand grip member 54 at one end having a spring-biased release bar contained within a longitudinal recess 56 (FIG. 4) in the grip member 54.

The arms 48, 50 also each include generally circular cups 58, 60 surrounding end portions of the tensioning shaft 42. Bushings, as at 62, 64, surround the shaft 42 and indicator bars 66, 68 are fastened to the ends of the tensioning shaft in alignment with the axially extending slot 44 in the tensioning shaft.

Offset a predetermined distance from the tensioning shaft 42 and journaled for rotation in guide plates 38, 40 is a shaft 70 on which is secured a brightly colored plastic flag 72 that contrasts with the color of the housing. The purpose of the flag will be described later in this specification.

Figure 3:
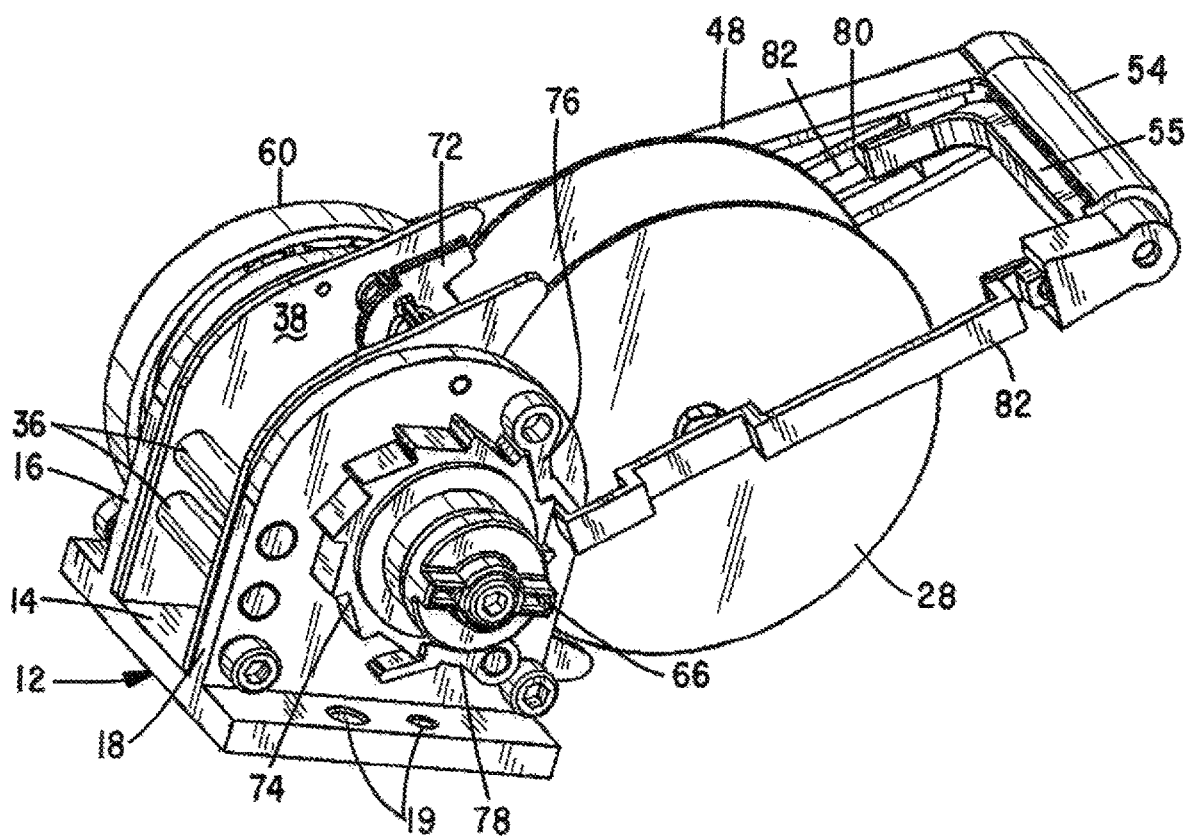
FIG. 3 is a side perspective view of FIG. 2 showing placement of the ratchet wheel pawls.
Figure 4:
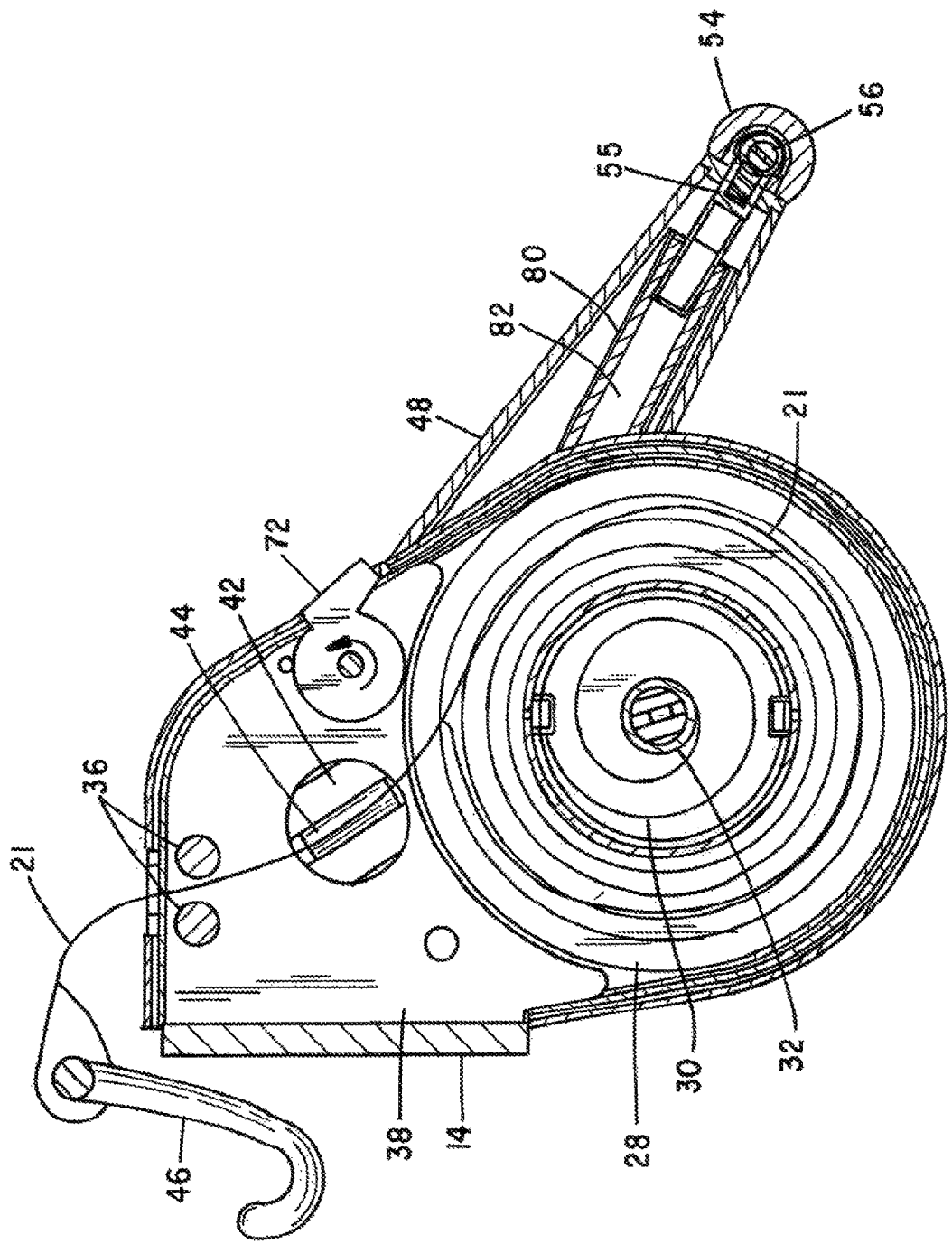
FIG. 4 is a cross section view showing details of the flat spiral spring and web strap spool arrangement.

Contained within the cup portions 58, 60 of the handle arms and keyed to the end portions of the tensioning shaft 42 are ratchet gears, one of which, 74 is seen in FIG. 3. Cooperating with each of the ratchet gears are a handle pawl 76 and a body pawl 78. Compression by squeezing the release bar 55 in the handle grip serves to move the handle pawl from an engaged to a disengaged portion with respect to the sprocket gears. More particularly, and as seen in FIGS. 3 and 4, integrally molded on the inner surface of the handle arms 48 and 50 are longitudinal channels, as at 80, in FIG. 4. Slideably disposed in each of the channels 48 and 50 are slide rods 82, a proximal end of each being coupled for movement of the slide rods by the squeezing and releasing of the spring-biased release bar 55. The distal end of the slide rods engage the handle pawls 76 that are pivotally joined to the frame ear members 16, 18.

Referring to FIG. 3, by squeezing the release bar 55, the pawl 76 becomes disengaged from the teeth on the ratchet gear 74. The body pawls 78 are also pivotally journaled to a frame ear 16, 18.

Having described in detail the constructional features of the device 10, consideration will next be given to its mode of operation.

When the mounting plate 14 is suitably affixed to, for example, a roof rack of a motor vehicle on which a load of objects, e.g., extension ladders, are being transported, a person may pull on the fastener 46 to withdraw the strap 21 from the reel 28 and, in doing so, winds up the flat coil spring 30 storing energy therein. At this time, the tensioning shaft 42 has its slot 44 aligned with the gap between the pair of guide rods 36 and the housing opening 26. This allows the strap to move reciprocally in and out of the housing with the flat coil spring acting to retract the strap as a tension force is applied and released on the strap. That is, if the strap is pulled out and not secured to an anchor point on the roof rack, the coil spring will spool back any slack. Once the strap is positioned around the load and the fastener 46 is connected to an anchor point, the ratchet can be used to rotate the tensioning shaft 42 to increase the force on the load. Once the tensioning shaft is rotated about one-half of a revolution, the strap becomes wrapped upon itself and will no longer be able to freely flow in and out through the slot in the shaft 42. If desired tension is achieved when the handle 52 is raised, it can be lowered without wrapping more strap about the shaft 42 by squeezing the pawl release bar 55. This draws back the guide rods 82 causing the pawls 76 to become disengaged from the associated ratchet gears.

To release the load, the pawls 76 and 78 must be disengaged from the ratchet wheels on the tensioning shaft. This results when the pawl release bar 55 is squeezed against the biasing force of the handle compression springs to retract the slide rods 82, while at the same time rotating the handle assembly 82 counterclockwise when viewed in FIG. 1 until the handle presses against pawls 76 and 78 to release them from the ratchet gears, now, the strap can be grasped and pulled to unwind what had earlier been wound upon the tensioning shaft so as to again allow the strap to freely pass through the slot 44 of the tensioning shaft 42 whereupon the flat spring 30 is able to rewind the strap upon the spool 28.

The indicator bars 66 and 68 affixed to the opposed ends of the tensioning shaft serve to indicate to the operator the direction of the slot 44 and allows for manual slot aligning for assuring free strap passage through the slot 44.

As earlier explained, a segment of the strap becomes wrapped about the tensioning shaft during the tensioning of the strap with respect to the load. When a predetermined number of wraps have taken place, the outer turn of the strap on the shaft will contact the flag 72 causing it to be rotated so as to project out from the housing. This serves as a signal that the user should readjust the anchor 46 to increase the tension rather than attempting to do so by further rotating the tensioning shaft using the handle assembly.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A retractable, load hold-down device comprising:
   a) a unitary metal frame having a pair of parallel, spaced-apart ears projecting normally from an anchor plate;
   b) a cylindrical metal tensioning shaft journaled for rotation in aligned apertures formed in the pair of ears and extending through opposed side walls of a housing affixed to the pair of ears, said tensioning shaft having an axially extending slot formed diametrically therethrough;
   c) at least one ratchet gear affixed to and rotatable with the tensioning shaft, said at least one ratchet gear disposed on an end portion of the tensioning shaft;
   d) a tubular spool mounted on a stationary shaft, the spool being journaled for rotation on the stationary shaft and the stationary shaft being supported by the housing in parallel relation to the tensioning shaft;
   e) a flat coil spring contained within the tubular spool having an inner end joined to the stationary shaft and an opposed end joined to an inner end of an elongated web strap wound about an exterior of the tubular spool;
   f) at least one handle arm having a first end journaled for rotation on the end portion of the tensioning shaft and having a hand grip member at a second end, said hand grip member containing a spring-biased release bar; and
   g) the release bar being coupled at one end to an elongated slide rod slidably supported by said at least one handle arm, the slide rod adapted to selectively engage with and disengage from a pawl associated with the at least one ratchet gear upon compression and release of the release bar.

2. The device of claim 1 and further including a second ratchet gear affixed to and rotatable with the tensioning shaft at an end portion thereof opposite from the end portion on which the one ratchet gear is attached.

3. The device of claim 2 and further including a second handle arm and a second slide rod slidably supported by the second handle arm, the second slide rod adapted to selectively engage with and disengage from the second ratchet gear upon compression and release of the release bar.

4. The device of claim 1 and further including an indicator on the tensioning shaft exterior of the housing and aligned with the axially extending slot.

5. The device of claim 1 wherein the web strap extends through the axially extending slot of the tensioning shaft.

6. The device of claim 1 and further including a flag member for signaling when a predetermined length of the web strap has been wound onto the tensioning shaft.

7. The device of claim 1 and further including a pair of parallel, spaced-apart guide pins secured at opposite ends to the ears of the frame for guiding the web strap out through an opening in the housing after passing through the axially extending slot of the tensioning shaft.

* * * * *